Jan. 1, 1924
E. E. WICKERSHAM
TRACTOR DRIVING SPROCKET
Filed Feb. 12, 1919
1,479,349
2 Sheets-Sheet 1
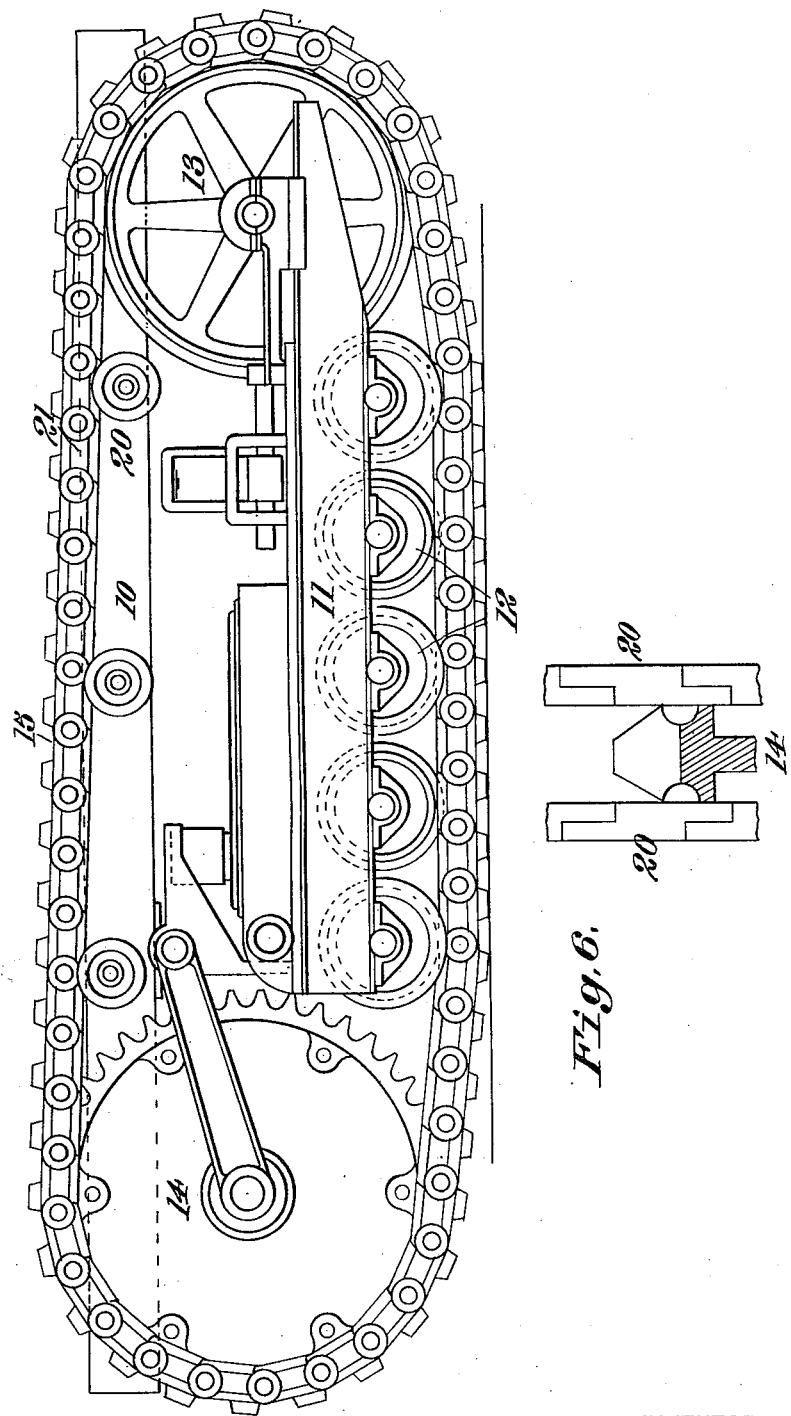
INVENTOR
*Elmer E. Wickersham*
BY
*Strong & Townsend*
ATTORNEYS

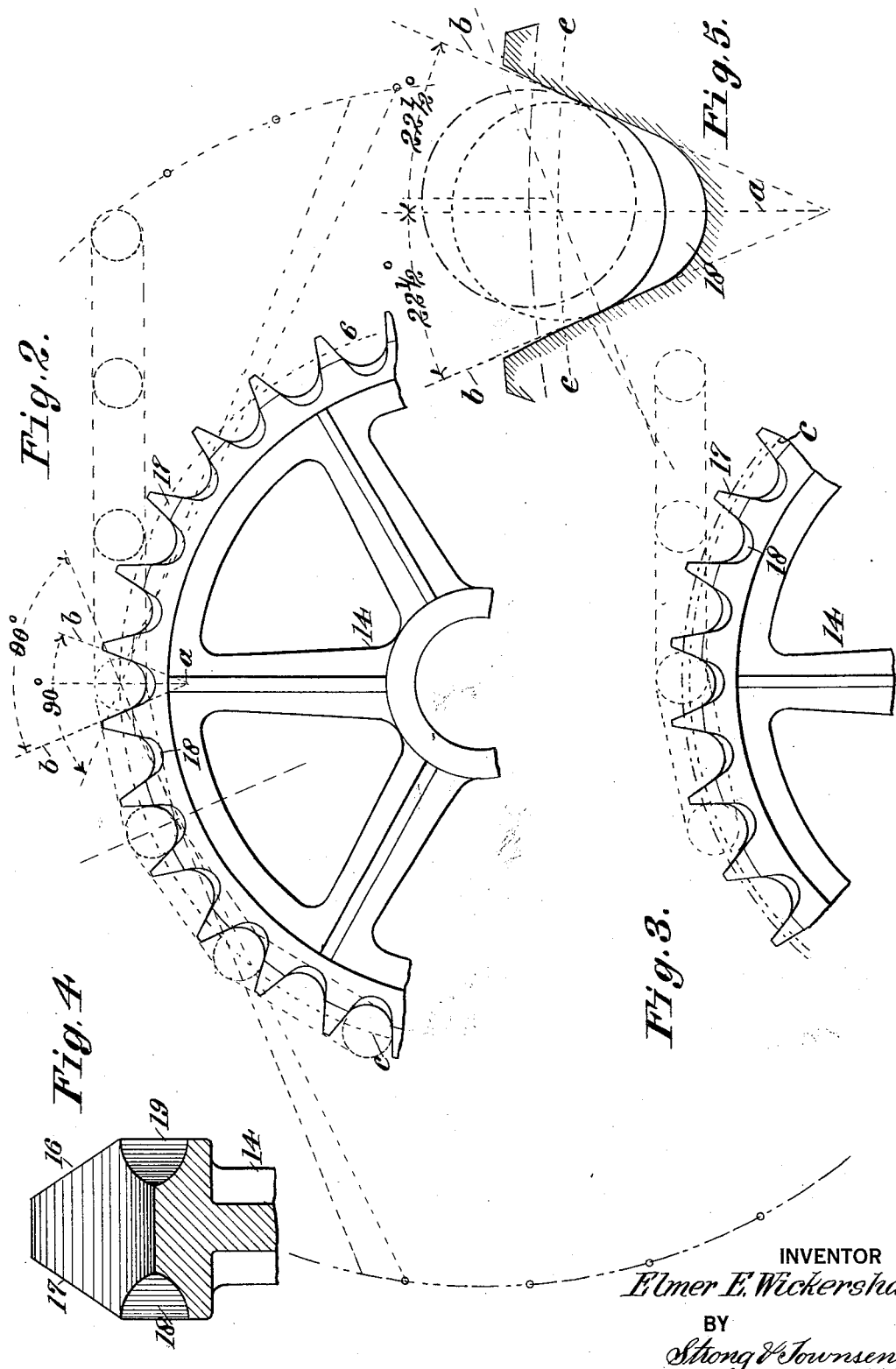

Patented Jan. 1, 1924.

1,479,349

UNITED STATES PATENT OFFICE.

ELMER E. WICKERSHAM, OF STOCKTON, CALIFORNIA, ASSIGNOR TO THE HOLT MANUFACTURING COMPANY, OF STOCKTON, CALIFORNIA, A CORPORATION OF CALIFORNIA.

TRACTOR DRIVING SPROCKET.

Application filed February 12, 1919. Serial No. 276,524.

*To all whom it may concern:*

Be it known that I, ELMER E. WICKERSHAM, a citizen of the United States, residing at Stockton, in the county of San Joaquin and State of California, have invented new and useful Improvements in Tractor Driving Sprockets, of which the following is a specification.

This invention relates to a driving sprocket for tractors of the self-laying track type.

Occasional difficulty has been experienced in the use of tractors of the self-laying track type, due to the fact that the articulated links of the track become clogged with dirt and thus produce a binding action when the teeth of the driving sprocket are in mesh, and also due to the fact that the driving sprocket teeth and the link pins will eventually wear in an objectionable manner.

It is the principal object of this invention to overcome these defects by providing a sprocket which will act to automatically clean the links of the chain track and to automatically adjust the chain to it as the chain wears, thus preventing excessive tension of the chain or objectionable slack.

It is also an object of this invention to provide a driving sprocket which will automatically adjust itself to the track chain in a manner to cause a plurality of sprocket teeth to be constantly exerting power upon the chain and thus making it possible to use a sprocket of smaller dimensions than has heretofore been attempted and at the same time obtaining a constant and desirable driving action without undue strain upon any one of the chain links or the sprocket teeth.

The present invention is particularly embodied in a sprocket having teeth which will enter the pocket of the links and force the dirt out through the sides thereof, said teeth being cut so that the pins of the links will automatically move upon an enlarged pitch circle as the teeth and link pins wear, thus maintaining a large number of teeth in constant engagement with the chain and maintaining the chain at a constant tension.

The invention is illustrated by way of example in the accompanying drawings, in which—

Fig. 1 is a view in side elevation, disclosing the sprocket as applied for use upon a tractor of the self-laying track type.

Fig. 2 is a fragmentary view in side elevation, illustrating a portion of the sprocket and further disclosing the manner in which the teeth are developed.

Fig. 3 illustrates a fragmentary portion of the sprocket, indicating by dotted lines the chain as it assumes a new pitch circle, due to wear.

Fig. 4 is an enlarged view in section and elevation, showing the face and root formation of one of the teeth.

Fig. 5 is an enlarged view in diagram, illustrating the face and gullet of one of the teeth and the manner in which automatic adjustment is produced.

Fig. 6 is a fragmentary view in transverse section, illustrating the manner in which the teeth act to clean the links of dirt between the rails thereof.

In the drawings, a tractor is shown having a main frame 10, at the opposite sides of which are track units. These units commonly comprise a truck frame 11 carrying load supporting rollers 12 and also providing a mounting for idler wheels 13. These wheels are in alignment with driving sprockets 14, around which truck structure a self-laying track 15 is passed. It will be understood that the present invention is not particularly concerned with the truck structure save as it relates to the sprocket 14 and its action. This sprocket is more clearly shown in Figs. 2 and 5, where it will be seen that the faces of the teeth are disposed at an angle of 45° to each other and are generated by an arc swung from a point in a line at right angles to the line of obliquity of the tooth face and having a radius of four times the pitch or length of the chain link. A tooth developed by this arc will be substantially flat, as indicated in Fig. 5. It is to be undertsood that while the line of obliquity in the present instance is shown as 22½°, it will be noted that other angles may be used, providing that they are in excess of 20°. This insures a heavy pitch angle and causes the force of the teeth to act to wedge the track pins outwardly and thus insures that each tooth will positively engage the track pins and will thus act in unison to exert a pulling action upon the track. In the present instance the track is in contact with a sprocket throughout substantially one-half of its circumference. By using a sprocket, as here shown, it will be certain that each of the teeth in this portion of the circumference will be in positive pulling engagement with each of the link pins therebetween and as the chain stretches and wears, the link pins will be forced outwardly along the pulling face of each tooth, thus creating a new pitch circle as indicated in Figs. 3 and 5. This action will, of course, continue and the chain will always remain stretched.

Referring particularly to Fig. 4, it will be noted that the side faces of the teeth are beveled, as indicated at 16 and 17. The side faces of the teeth near the bottom of the gullet are scalloped, as indicated at 18 and 19. This peculiar formation is provided to cause the links of the track 15 to be cleaned, it being understood that under most conditions these links possess rails 20, between which the teeth pass. These rails are formed with side openings 21 and when the wedge-shaped ends of the teeth pass in between the rails, the accumulation of dirt will be forced outwardly through the side openings, as indicated in Fig. 6. In the event that all of the dirt is not forced out through the openings, the link pins may force some of it along the opposite side faces of the sprockets and this will be accommodated in the scalloped recesses 18 and 19, thus insuring that sufficient dirt will be forced away to prevent a binding action between the teeth and the link pins and a resultant excessive tension strain upon the chain.

In forming the sprocket, it will be assumed that $a$ is the center line of one tooth gullet, the angle of obliquity being $22\frac{1}{2}°$ each side of the center line and thus described by the line $b$, as indicated in Fig. 5. The center of the pitch arc is then determined by describing the line which will pass through the center line $a$ upon the original pitch line $c$ and will extend at right angles to the line $b$, the length of this radius, as before stated, being four times the pitch or length of the chain links. The tooth face described by this arc will be slightly deflected from the line $b$ near the point of the tooth and will thus produce a face having a pressure angle of substantially $22\frac{1}{2}°$. The gullet of the tooth is originally described from the point of intersection of the center line $a$ with the pitch circle $c$ and is of a radius equal to or greater than the radius of the link pin. The scallops 18 and 19 are formed by cutting into the sides of the gears at points at the edge of the gullet, presenting a formation having the appearance of a crescent, as shown in Fig. 3.

From the foregoing description, the operation of the invention may be clearly understood as the pressure angle of the teeth is such as to force the pins outwardly and to thus increase the pitch diameter, at the same time taking up the slack in the entire length of chain.

While I have shown the preferred form of my invention, it will be understood that various changes in the combination, construction and arrangement of parts may be made by those skilled in the art, without departing from the spirit of the invention as claimed.

Having thus described my invention, what I claim and desire to secure by Letters Patent is—

1. The combination with a chain track having cylindrical teeth of a driving sprocket therefor, said sprocket being formed with teeth having driving faces disposed at an angle of approximately 45° to each other and acting to wedge the pin teeth of the chain outwardly whereby to permit the chain to assume various pitch diameters on the sprocket, such diameters increasing in proportion with the elongation of the chain due to pitch or wear.

2. A chain track sprocket wheel having a plurality of teeth, the sides of which at right angles to the working faces, are beveled to form a substantially pointed tooth and the side faces of the gullets being recessed to form clearance pockets.

3. A chain track driving sprocket for tractors, having a plurality of teeth, the faces of which are tangent to a line of obliquity greater than 20° and are described by radii equal to four times the length of the chain links and emanating from a point on a line at right angles to the line of obliquity of the tooth faces.

In testimony whereof I have hereunto set my hand in the presence of two subscribing witnesses.

ELMER E. WICKERSHAM.

Witnesses:
P. EHRENFELD,
DAVID B. LYMAN.